United States Patent
Ting

(10) Patent No.: US 10,123,512 B2
(45) Date of Patent: Nov. 13, 2018

(54) ASSEMBLED PET FRAMEWORK MADE OF PAPER

(71) Applicant: Petsweet Co., Ltd., Taipei (TW)

(72) Inventor: Chia-Hsiang Ting, Taipei (TW)

(73) Assignee: Petsweet Co., Ltd., Taipei (TW)

( * ) Notice: Subject to any disclaimer, the term of this patent is extended or adjusted under 35 U.S.C. 154(b) by 343 days.

(21) Appl. No.: 14/940,259

(22) Filed: Nov. 13, 2015

(65) Prior Publication Data
US 2017/0135317 A1 May 18, 2017

(51) Int. Cl.
*A01K 1/03* (2006.01)
*A01K 15/02* (2006.01)

(52) U.S. Cl.
CPC ............ *A01K 15/024* (2013.01); *A01K 1/033* (2013.01); *A01K 15/027* (2013.01)

(58) Field of Classification Search
CPC ......... A01K 1/03; A01K 1/033; A01K 15/024
USPC ........ 119/452, 473, 474, 482, 498, 702, 706
See application file for complete search history.

(56) References Cited

U.S. PATENT DOCUMENTS

| | | | | |
|---|---|---|---|---|
| 4,301,766 A | * | 11/1981 | Piccone | A01K 1/035 119/482 |
| 4,347,807 A | * | 9/1982 | Reich | A01K 1/033 119/499 |
| 5,050,536 A | * | 9/1991 | Baker | A01K 1/033 119/499 |
| 5,080,042 A | * | 1/1992 | Rubin | A01K 15/027 119/706 |
| 5,320,065 A | * | 6/1994 | Leopold | A01K 15/025 119/498 |
| 6,758,167 B1 | * | 7/2004 | Edelinski | A01K 1/033 119/498 |
| 6,886,495 B1 | * | 5/2005 | Madden | A01K 1/033 119/482 |
| 7,337,748 B1 | * | 3/2008 | Morris | A01K 1/033 119/482 |
| 7,584,720 B1 | * | 9/2009 | Jackson | A01K 1/033 119/452 |
| 8,522,724 B2 | * | 9/2013 | Murrer | A01K 1/033 119/706 |

(Continued)

FOREIGN PATENT DOCUMENTS

TW M503755 7/2015

*Primary Examiner* — David J Parsley
(74) *Attorney, Agent, or Firm* — Alan D. Kamrath; Kamrath IP Lawfirm, P.A.

(57) ABSTRACT

An assembled pet framework made of paper includes a geometric body made of corrugated paper and cut to not only form therein a geometric through hole but also obtain a geometric cylinder, a geometric disk, geometric rings, a disk and a plate centrally provided with a geometric hole, which are put together to form a pet toy framework. Multiple geometric bodies and multiple geometric rings are put together to form a pet toy maze. The corrugated paper is made from eco-friendly, recyclable and reusable materials. Body-shaped corrugated paper and plate-shaped corrugated paper are cut with a minimal waste of materials or even without wasting any materials to therefore protect the environment and save materials. The bodies, rings, and disks are coupled together to form pet-related devices of different shapes. Multiple bodies and rings together form a cat maze in which cats play.

6 Claims, 9 Drawing Sheets

(56) References Cited

U.S. PATENT DOCUMENTS

| | | | | |
|---|---|---|---|---|
| 8,640,652 B2* | 2/2014 | Callari | ................ | A01K 15/025 |
| | | | | 119/702 |
| 2005/0051108 A1* | 3/2005 | Syrigos | ................ | A01K 1/033 |
| | | | | 119/416 |

* cited by examiner

ASSEMBLED PET FRAMEWORK MADE OF PAPER

BACKGROUND OF THE INVENTION

Technical Field

The present invention relates to the technical field of pet-related devices and, more particularly, to an assembled pet framework made of paper and designed to not only make good use of materials but also to enable variations in the assembled pet framework or pet-related goods, with the assembled pet framework made of eco-friendly, recyclable and reusable materials.

Description of Prior Art

Taiwan patent application No. 104203094 is entitled Cat Scratcher House Structure and is directed to a cat scratcher house structure made entirely of plates made of corrugated paper and jointed. The cat scratcher house structure comprises a body and a roof. The lower space of the body accommodates a cat. The inner surface of the body is coarse enough for the cat to scratch with its claws. The roof is disposed on top of the body and has an upper space which accommodates the cat. Both the top surface of the roof and the upper space-facing inner surface of the roof are coarse enough for the cat to scratch with its claws.

The cat scratcher house structure is disadvantaged by its invariable monotonous shape. Furthermore, making a cat scratcher house requires cutting the cat scratcher house structure to hollow out a central oblong hole, round holes, and the portion between the square and triangle of the roof in the cat scratcher house structure, but the aforesaid cuts of the cat scratcher house structure serve no other purposes than being garbage, thereby leading to a waste of materials. As a result, the prior art still has room for improvement.

SUMMARY OF THE INVENTION

It is an objective of the present invention to provide an assembled pet framework made of paper. Bodies and boards are cut from corrugated paper to thereby allow rings and disks to be cut from the bodies and the boards and to thereby allow holes to be formed therein with a minimal waste of materials. Thus, the bodies and the rings together form a pet maze, and a cylinder, a plate, the rings and the disks together form a pet framework, thereby exhibiting variations and diversity.

In order to achieve the above and other objectives, the present invention provides an assembled pet framework made of paper, comprising a geometric body made of corrugated paper and penetrated by at least one geometric through hole. A geometric cylinder or geometric disk obtained by cutting out the at least one geometric through hole, together with geometric rings, a geometric disk and a geometric plate centrally provided with a geometric hole, which are cut out of boards made of corrugated paper, can be put together to form a pet toy framework. Multiple geometric bodies and multiple geometric rings can be put together to form a pet toy maze. The corrugated paper is made from eco-friendly, recyclable and reusable materials. Body-shaped corrugated paper and plate-shaped corrugated paper are cut with a minimal waste of materials or even without wasting any materials to therefore protect the environment and save materials. The bodies, rings, and disks are coupled together to form pet-related devices of different shapes. Multiple bodies and rings together form a cat maze in which cats play.

DETAILED DESCRIPTION OF THE EMBODIMENT OF THE INVENTION

Figure 1:
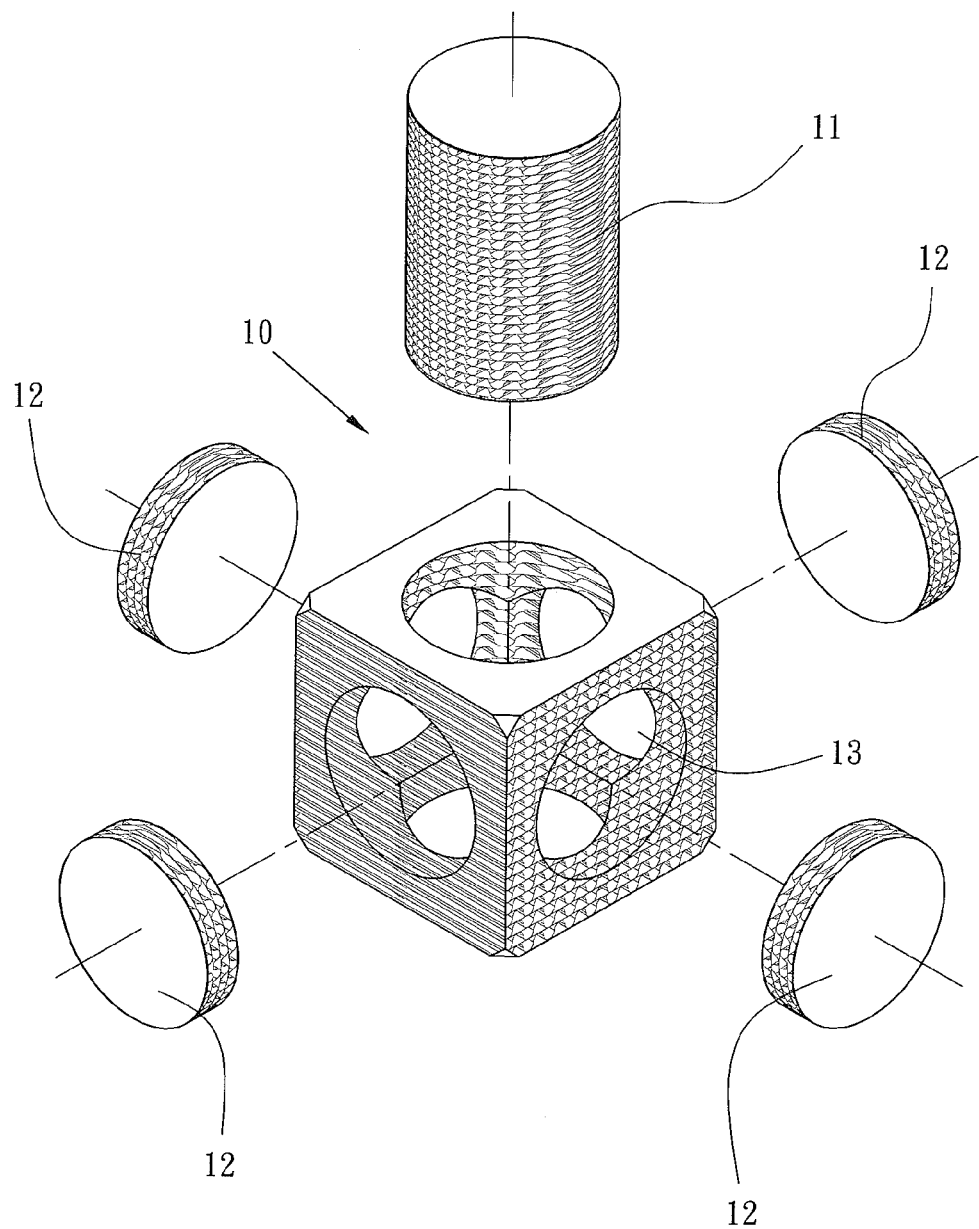
FIG. 1 is an exploded view of a cube made of corrugated paper according to an embodiment of the present invention.
Figure 2:
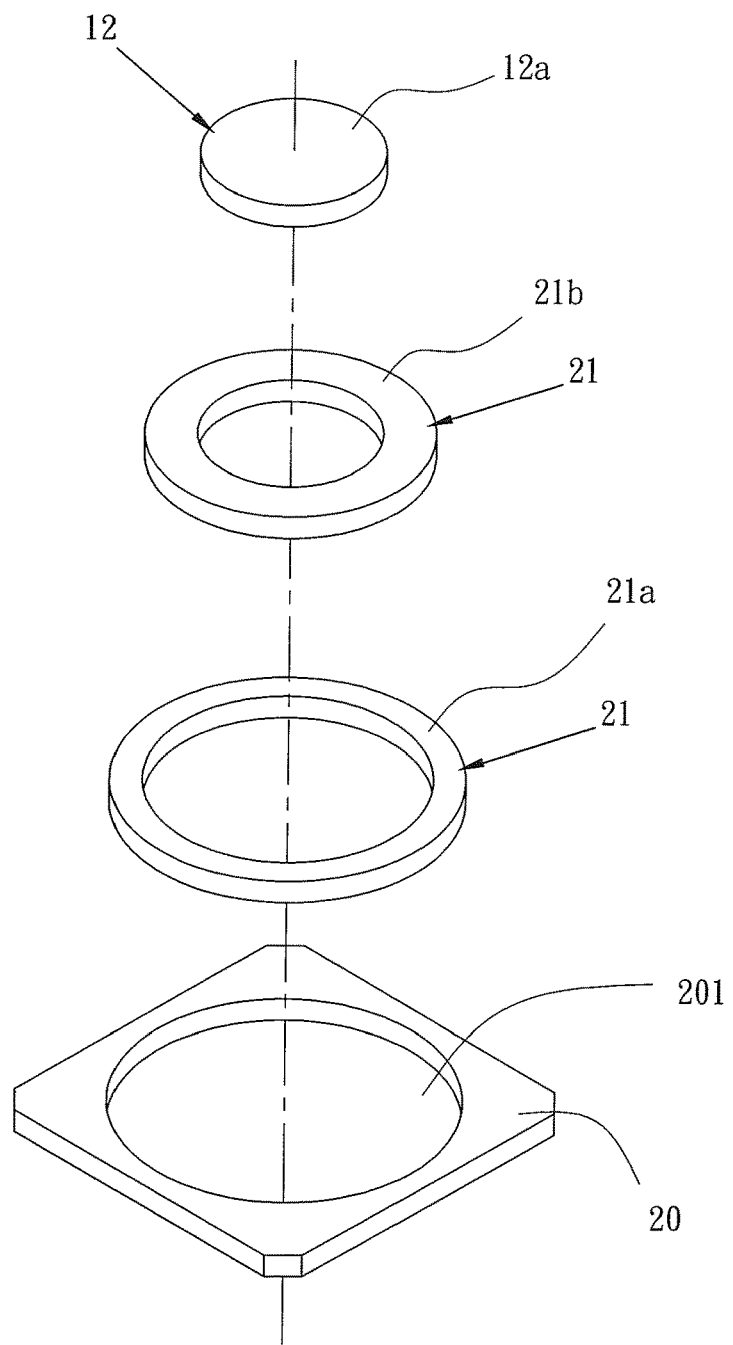
FIG. 2 is an exploded view of a board made of corrugated paper according to another embodiment of the present invention.
Figure 3:
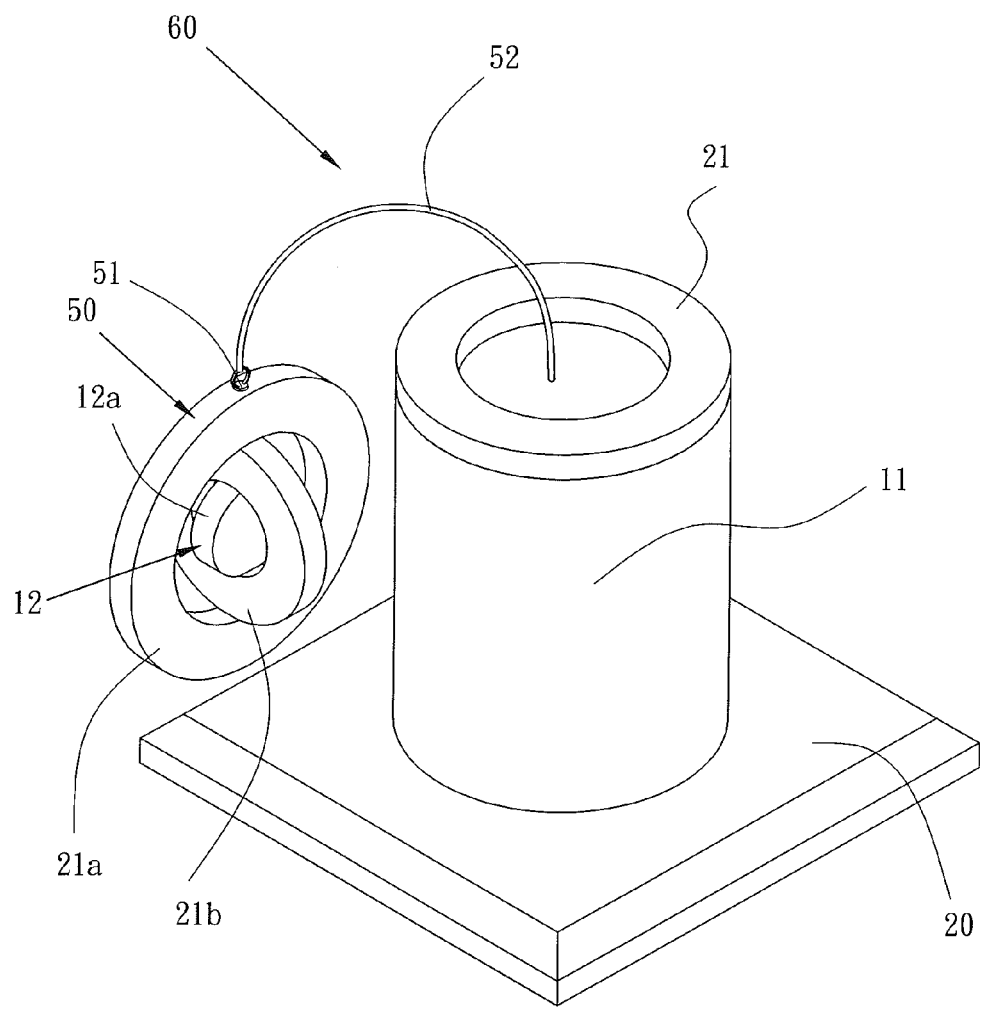
FIG. 3 is a perspective view of a pet toy component produced from an assembled pet framework made of paper according to the present invention.

Referring to FIG. 1 through FIG. 9, the present invention provides an assembled pet framework made of paper. The assembled pet framework made of paper comprises a geometric cube 10 made of corrugated paper and multiple boards made of corrugated paper.

The geometric cube 10 made of corrugated paper is cut to provide a geometric cylinder 11 and four geometric disks 12, and thus a through geometric hole 13 is formed on each of the six faces of the geometric cube 10.

The multiple boards made of corrugated paper is cut to provide a large geometric ring 21a, a moderate geometric ring 21b, a geometric disk 12, and a geometric plate 20. A geometric opening 201 is centrally formed at the geometric plate 20. Hence, a geometric cube 10 with six penetrated faces, multiple geometric disks 12, multiple geometric rings 21, and multiple geometric plates 20 (shown in FIGS. 1, 2) are obtained with a minimal waste of materials.

Figure 6:
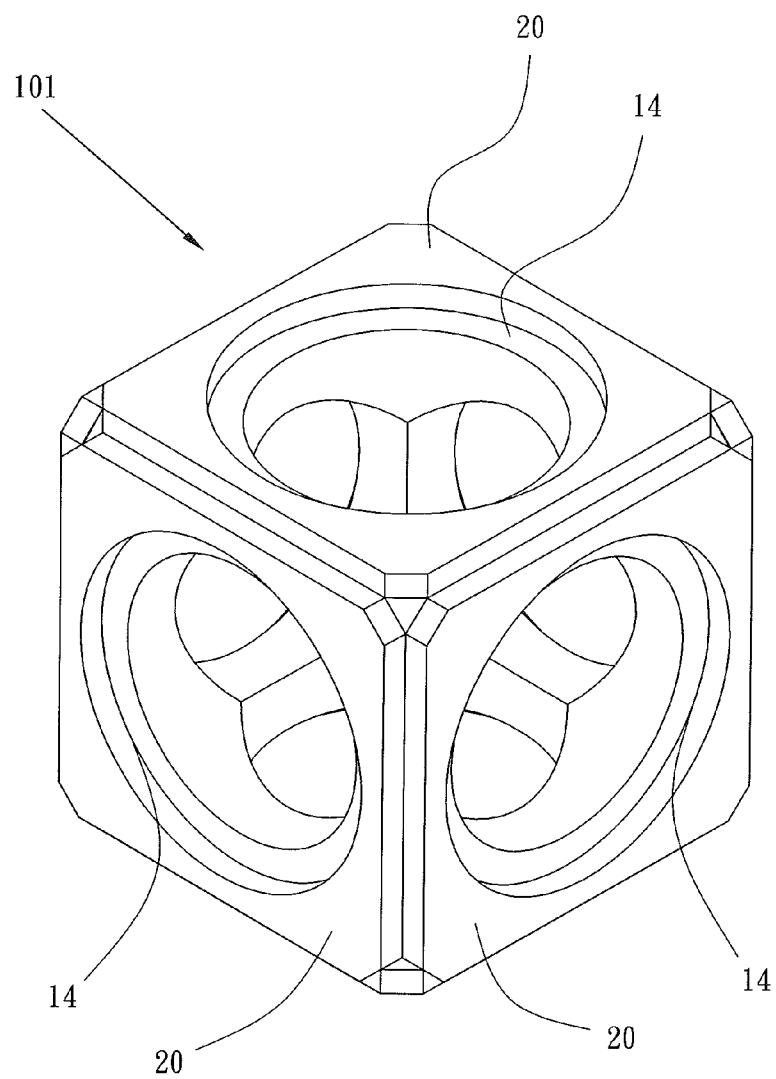
FIG. 6 is a perspective view of a geometric cube unit produced from the assembled pet framework according to the present invention.
Figure 7:
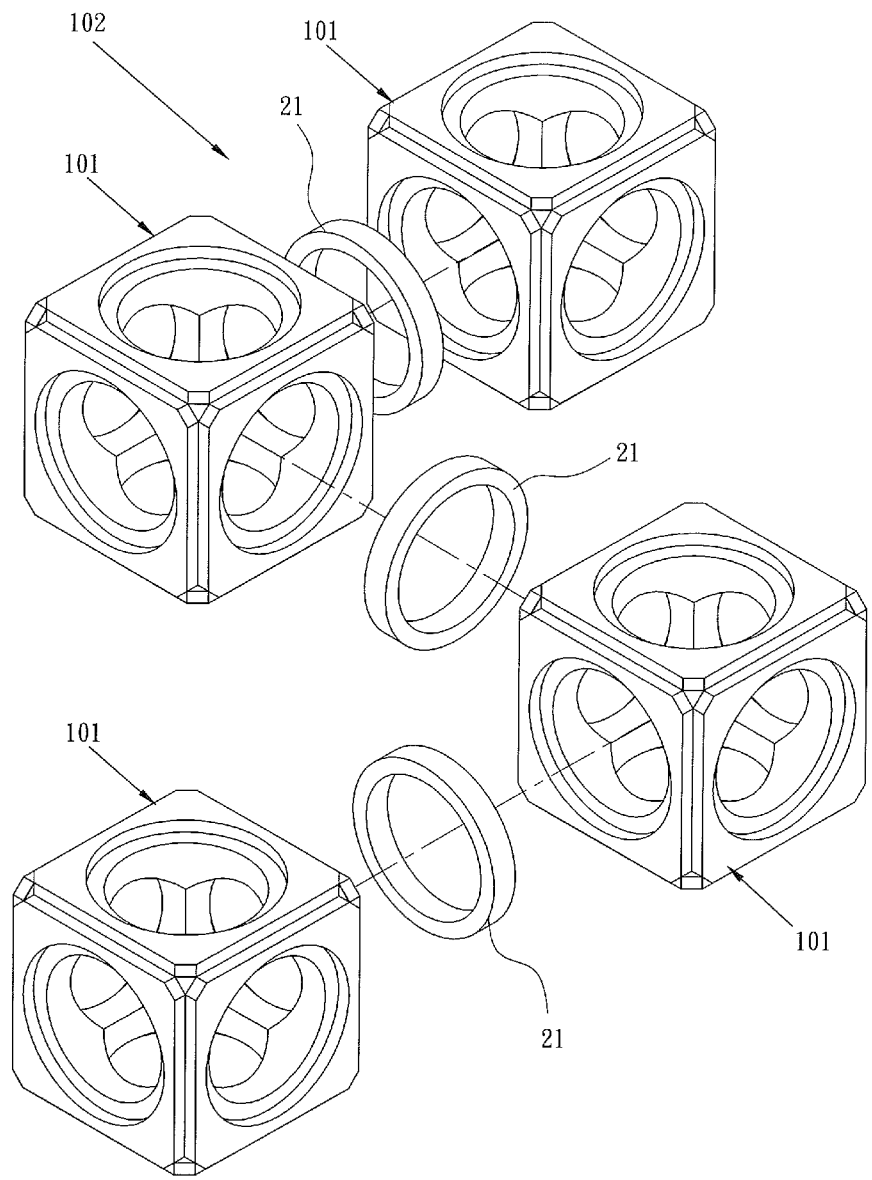
FIG. 7 is an exploded view of a pet maze component produced from the assembled pet framework according to the present invention.

Regarding the assembled pet framework made of paper, a geometric plate 20 is fixed to each of the six penetrated faces of the geometric cube 10, and the diameter of the geometric openings 201 of the geometric plates 20 is larger than the diameter of the geometric holes 13 of the geometric cube 10, so as to form stepped geometric holes 14 and turn each geometric cube 10 into a geometric cube unit 101 (shown in FIG. 6).

Regarding the assembled pet framework made of paper, the geometric cube 10 is preferably cubic (shown in FIG. 1).

Regarding the assembled pet framework made of paper, a small geometric disk 12a is fixed to each geometric disk 12 from below, whereas geometric rings 21 with the same outer diameter as that of the geometric disks 12 are fixed to the geometric disks 12 from above, respectively, so as to form a heightening unit 30 (shown in FIGS. 4, 5).

Figure 4:
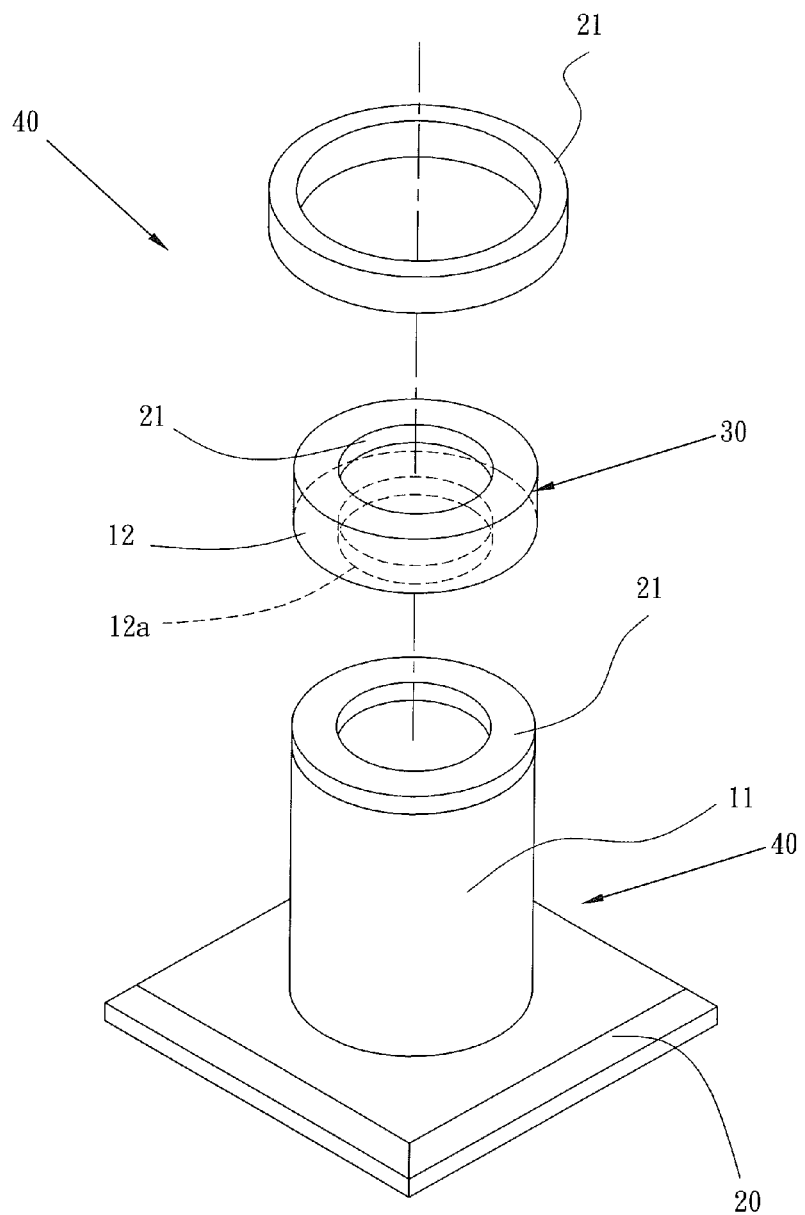
FIG. 4 is an exploded view of a pet framework unit produced from the assembled pet framework according to the present invention.
Figure 5:
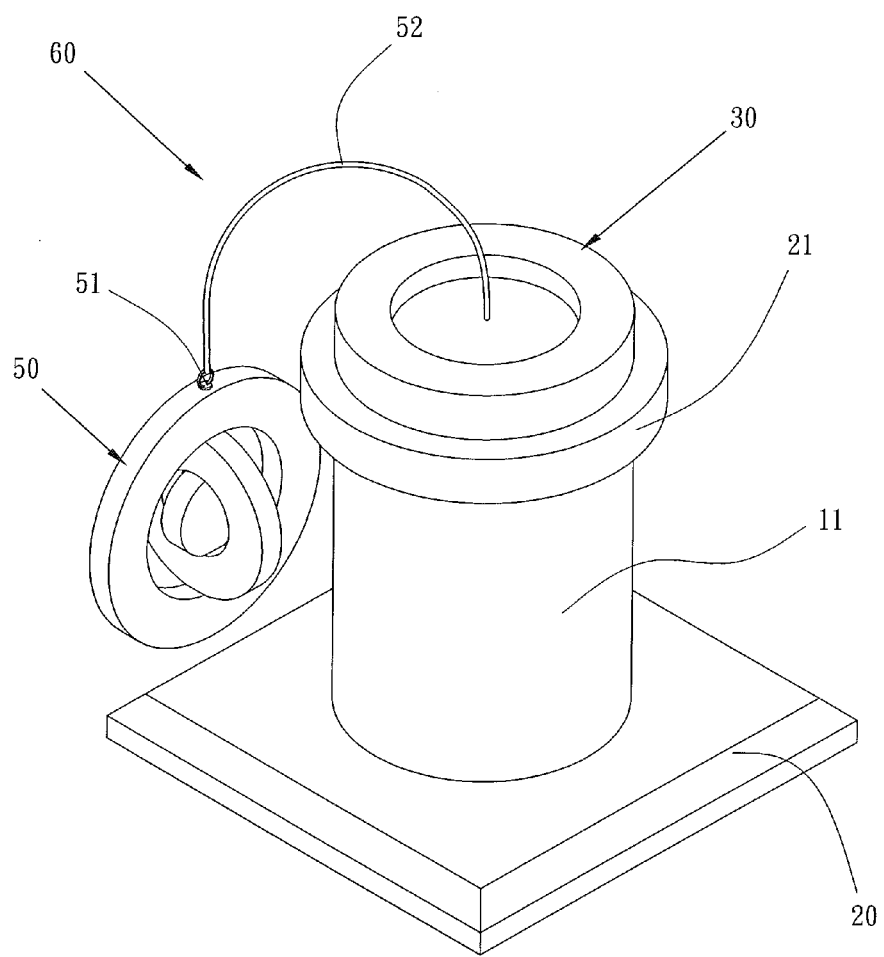
FIG. 5 is a perspective view of another pet toy component produced from the assembled pet framework according to the present invention.

Regarding the assembled pet framework made of paper, multiple geometric plates 20, a geometric cylinder 11, and a geometric ring 21 are coupled together to form a pet framework unit 40 (shown in FIG. 4).

Regarding the assembled pet framework made of paper, the large geometric ring 21a, the moderate geometric ring 21b, and the geometric disk 12 are penetrated centrally by a moderate shaft 51 and thus connected pivotally, and the moderate geometric ring 21b rotates by 90 degrees, so as to form a pet toy unit 50 (shown in FIG. 3) which is spherical.

Regarding the assembled pet framework made of paper, the pet framework unit 40 has its height varied by multiple heightening units 30 and is connected to the moderate shaft 51 of the pet toy unit 50 by a cord 52 to thereby form a pet toy component 60. The geometric ring 21 is disposed around and between the paired heightening units 30 to stabilize the height increased (as shown in FIG. 5).

Regarding the assembled pet framework made of paper, corrugated paper segments are adhered to junctions of the geometric holes 13, the geometric ring 21, and the geometric disks 12 to serve a thickening purpose and enable tight-fitting joints.

Regarding the assembled pet framework made of paper, the geometric holes 13, the geometric ring 21, and geometric disks 12 are jointed by an adhesive.

Regarding the assembled pet framework made of paper, the geometric holes 13 are preferably round (as shown in FIG. 1).

An assembled pet framework made of paper comprises multiple geometric cubes 10 made of corrugated paper and multiple boards made of corrugated paper.

The multiple geometric cubes 10 are each made of corrugated paper and adapted to be cut in a manner to form a through geometric hole 13 on each of the six faces of the geometric cube 10.

The multiple boards made of corrugated paper are each cut to provide a geometric plate 20. The geometric plate 20 is centrally provided with a geometric opening 201. One said geometric plate 20 is fixed to each of the six faces of each of the geometric cubes 10. The diameter of the geometric openings 201 of the geometric plates 20 is larger than the diameter of the geometric holes 13 of the geometric cubes 10, so as to form the stepped geometric holes 14 and turn each geometric cube 10 into a geometric cube unit 101 (shown in FIG. 7).

Figure 8:
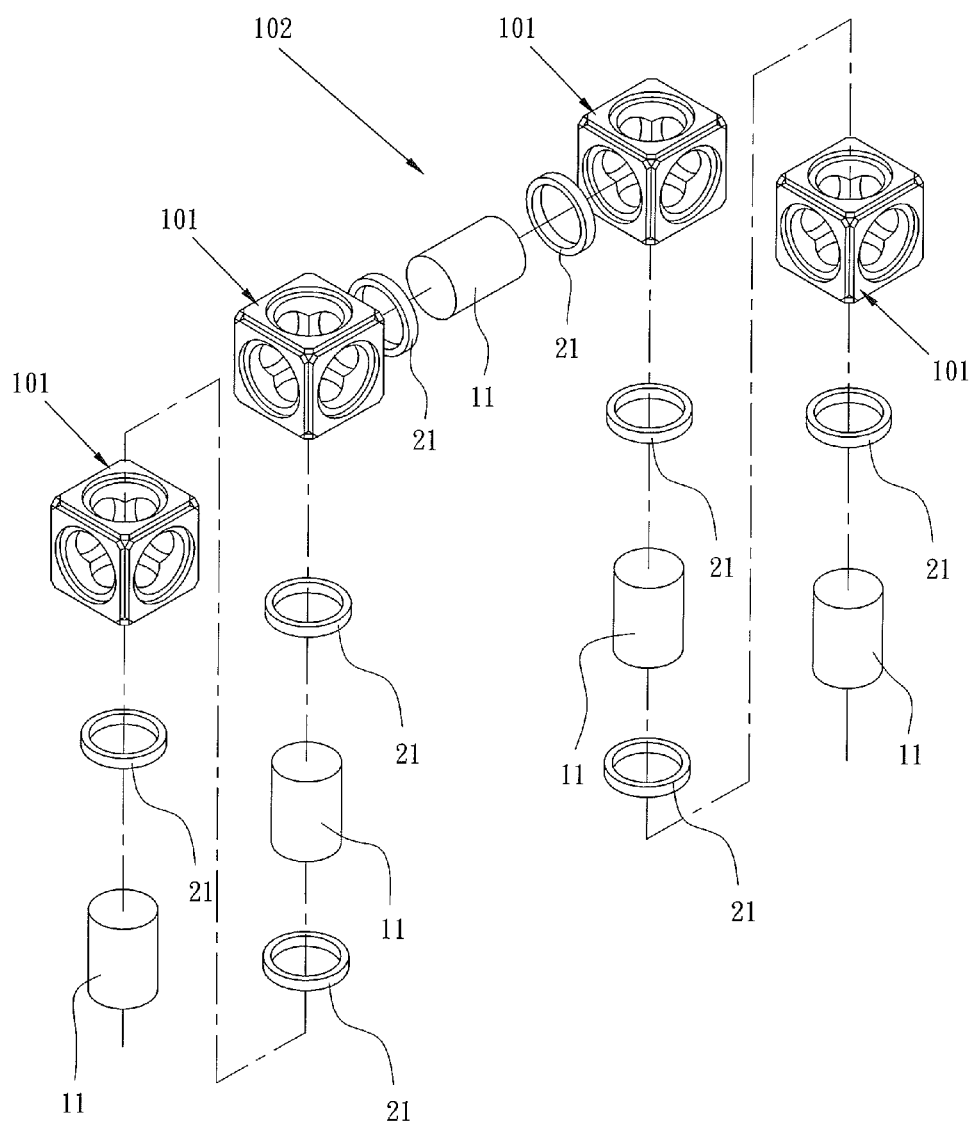
FIG. 8 is an exploded view of another pet maze component produced from the assembled pet framework according to the present invention.

The multiple geometric rings 21 are disposed in the stepped geometric holes 14 between the paired geometric cube units 101, respectively, such that all the geometric cube units 101 together form a pet maze component 102 (shown in FIG. 8).

Figure 9:
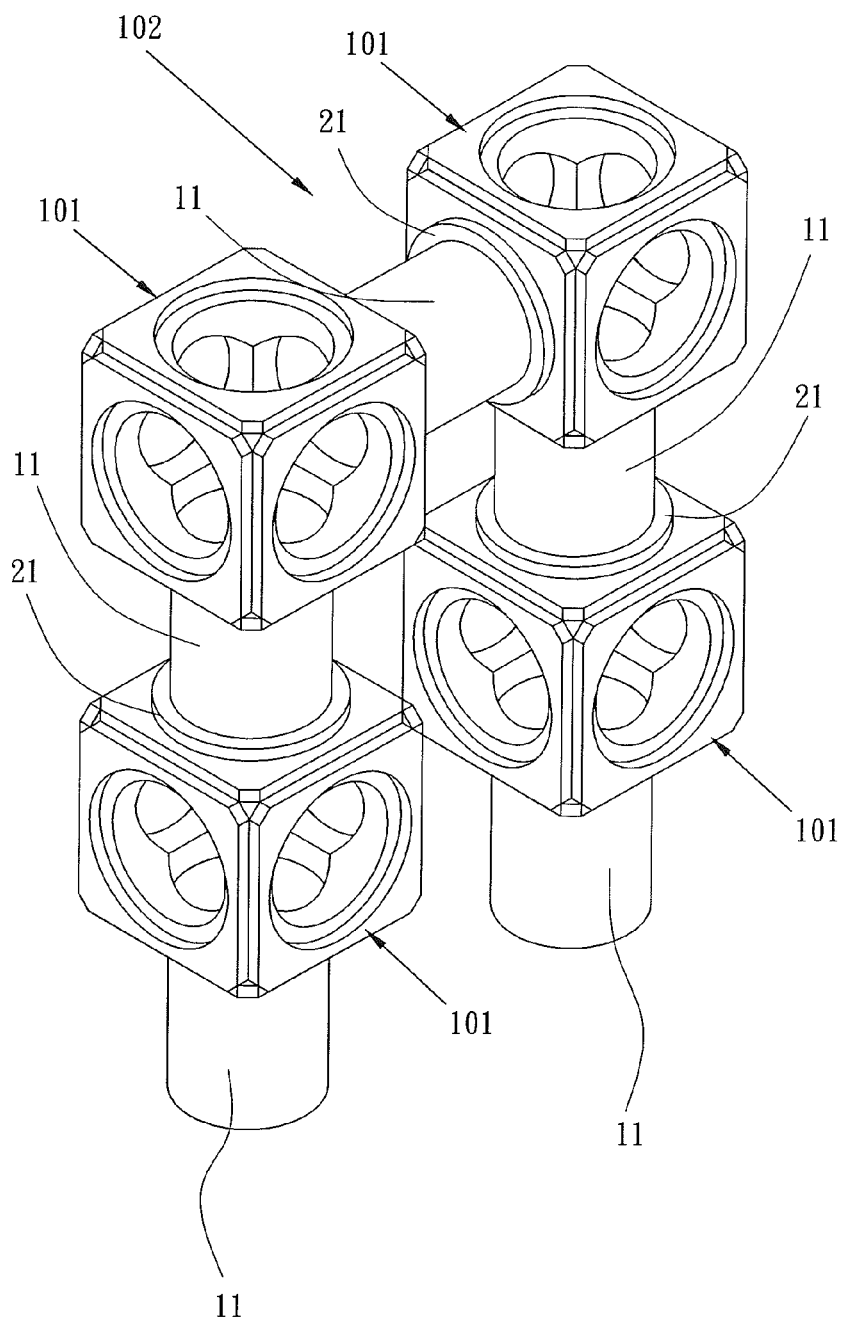
FIG. 9 is a perspective view of the pet maze component produced from the assembled pet framework according to the present invention.

The multiple geometric rings 21 are disposed in the stepped geometric holes 14 between the paired geometric cube units 101, respectively, and a geometric cylinder 11 is disposed between the paired geometric rings 21, such that all the geometric cube units 101 together form another pet maze component 102 (shown in FIGS. 8, 9).

Regarding the assembled pet framework made of paper, the geometric holes 13 are preferably round (as shown in FIG. 1).

Regarding the assembled pet framework made of paper, the geometric cube 10 is preferably cubic (as shown in FIG. 1).

Regarding the assembled pet framework made of paper, corrugated paper segments are adhered to junctions of the geometric rings 21 and the stepped geometric holes 14 to serve a thickening purpose and enable tight-fitting joints.

Regarding the assembled pet framework made of paper, the geometric rings 21 and the stepped geometric holes 14 are jointed by an adhesive.

An assembled pet framework made of paper comprises a geometric cube 10 made of corrugated paper. The geometric cube 10 is cut to form at least one through geometric hole 13 (shown in FIG. 1) on the geometric cube 10.

Regarding the assembled pet framework made of paper, the geometric cube 10 is preferably cubic (as shown in FIG. 1).

Regarding the assembled pet framework made of paper, the geometric holes 13 are preferably round (as shown in FIG. 1).

Regarding the assembled pet framework made of paper, the at least one through geometric hole 13 is preferably round and in the number of six to therefore be disposed on the six faces of the geometric cube 10, respectively, as shown in FIG. 1.

As indicated above, according to the present invention, the assembled pet framework made of paper is not only novel and thus meets the novelty requirement of patentability, but is also comprehensively innovative and thus meets the non-obviousness requirement of patentability. Furthermore, the assembled pet framework is made of paper and designed to not only make good use of materials but also enable variations in the assembled pet framework or pet-related goods, not to mention that the assembled pet framework is made of eco-friendly, recyclable and reusable materials, thereby having high industrial applicability.

What is claimed is:

1. An assembled pet framework made of paper, comprising:
    multiple geometric cubes made of corrugated paper and each adapted to be cut to form a through geometric hole on each of six faces of each said geometric cube;
    multiple boards made of corrugated paper and each adapted to be cut to provide a geometric plate centrally provided with a geometric opening, wherein one said geometric plate is fixed to each of the six faces of each geometric cube, wherein a diameter of the geometric openings of the geometric plates is larger than a diameter of the through geometric holes of the multiple geometric cubes, to form stepped geometric holes and turn each said geometric cube into a geometric cube unit; and
    multiple geometric rings disposed in the stepped geometric holes between the geometric cube units, respectively, wherein the geometric cube units together form a pet maze component.

2. The assembled pet framework made of paper of claim 1, wherein the multiple geometric rings are disposed in the stepped geometric holes between the geometric cube units, respectively, wherein a geometric cylinder is disposed between the multiple geometric rings, and wherein the geometric cube units and the geometric cylinder together form another pet maze component.

3. The assembled pet framework made of paper of claim 1, wherein the stepped geometric holes are round.

4. The assembled pet framework made of paper of claim 3, wherein the multiple geometric cubes are cubic.

5. The assembled pet framework made of paper of claim 4, wherein corrugated paper segments are adhered to junctions of the multiple geometric rings and the stepped geometric, holes to serve a thickening purpose and enable tight-fitting joints.

6. The assembled pet framework made of paper of claim 4, wherein the multiple geometric rings and the stepped geometric holes are jointed by an adhesive.

* * * * *